May 23, 1961  J. E. FADELY  2,984,930
FISH HOOK SPREADER
Filed July 21, 1958
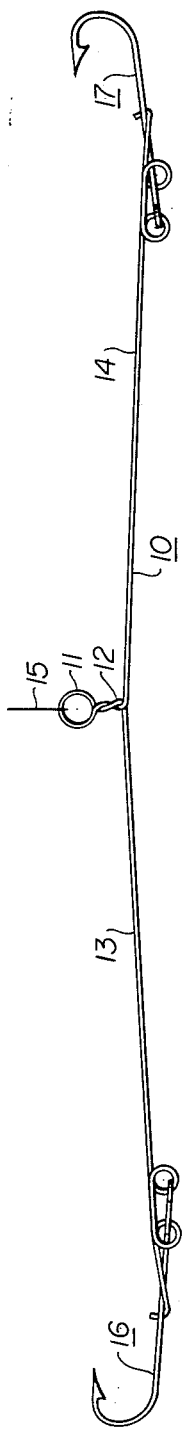
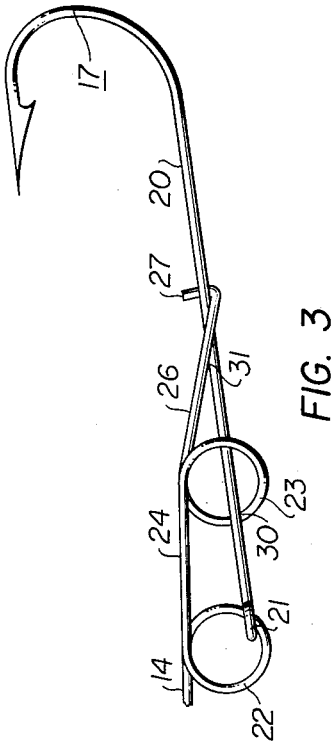
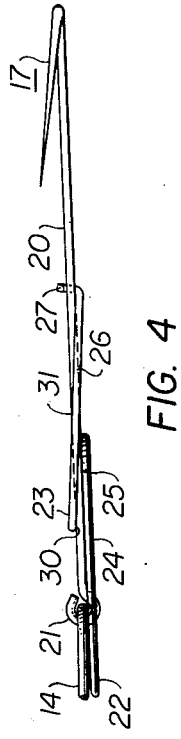
INVENTOR.
JAN ELLIS FADELY
BY Pyle & Fisher
ATTORNEYS 2,984,930
FISH HOOK SPREADER
Jan E. Fadely, R.D. 1, Catawba Island, Ohio
Filed July 21, 1958, Ser. No. 749,771
2 Claims. (Cl. 43—44.84)

This invention relates to a fishing apparatus, and more particularly, to devices known as "fish hook spreaders."

When sportsmen fish for game fish, and particularly in fresh water, it is common practice to connect a fish hook to a line through the use of a wire leader. Where game laws permit a plurality of hooks to be used, the leader often takes the form of a device known as a "spreader." The leader is used both to protect the fish line from the teeth of such large fish as muskellunge or northern pike and to minimize fouling. In prior known devices the primary purpose of the spreader has been the latter, that is, to prevent fouling of the plurality of hooks.

In the well known prior art spreaders commonly used by fishermen, a pair of ordinary snell hooks, preferably suspended on either gut or wire leaders, are connected to the spreader in spaced parallel positions. The shank of the hook is suspended along a vertical path when the spreader and hooks are in use. This vertical suspension minimizes the ability of the fish to grasp the bait and the hook and limits the success of the fishermen.

Accordingly, one of the principal objects of the invention is to provide a novel and improved fish hook supporting device which supports the hook with the shank transverse to the line and in essentially a horizontal position to increase the facility with which the fish can take the hook and thereby increase the number of fish caught by a fisherman using the device.

Another and related object of the invention is to provide a novel and improved fish hook spreader in which the shanks of each of a plurality of fish hooks are held in horizontal positions when in use to permit fish to take the hook and bait with facility.

When a fisherman is fishing it is often desirable to change fish hooks. The size of the fish hook is determined by the type and size of the fish which are biting.

Therefore, another of the objects of this invention is to provide a novel and improved leader to which an ordinary hook may be connected or disconnected with facility to permit hooks of varying sizes to be interchanged on one leader.

A related and more specific object of the invention is to provide a novel and improved leader fish hook connection which relies on the inherent resiliency of the leader to grip the hook in a selected position and retain it there, wherein such connection includes a loop which is circumferentially disposed about the shank of the fish hook and which serves as a fulcrum for the gripping action, a shank eyelet receiving part, and a shank gripping section disposed on the side of the loop opposite from the eyelet receiving part to urge the shank of the hook around the loop fulcrum.

Other objects and a fuller understanding of the invention may be had by referring to the following description and claims, taken in conjunction with the accompanying drawing in which:

Figure 1 is a side elevational view of the preferred embodiment of the device as used in a fish hook spreader;

Figure 2 is a side elevational view of an alternate construction of the device of Figure 1, which is designed for use with a single hook;

Figure 3 is a foreshortened side elevational view of the end of either the device of Figure 1 or Figure 2 and on an enlarged scale with respect to both Figures 1 and 2; and Figure 4 is a top plan view of the portion of the device shown in Figure 3.

Referring to Figure 1 of the drawings, a fish hook spreader is shown generally at 10. The spreader in its preferred and disclosed form is an elongated, one piece wire member folded upon itself. At the center of the spreader 10 a line connecting loop 11 is formed. The connecting loop is connectable to a fish line 15. The spreader 10 has a twisted portion 12 which is disposed in essentially a vertical path. The twisted portion 12 connects the loop 11 to the remainder of the spreader 10.

The spreader 10 has first and second elongated horizontal extension arms 13, 14. The horizontal extensions are disposed transversely of the twisted part 12 and essentially perpendicular to it. The horizontal extensions 13, 14 are also essentially coaxial so that, in general, one is an extension of the other.

First and second hooks 16, 17, which are preferably long shanked hooks, are connected to the extension arms 13, 14 respectively. The connection of the hook 16 to the arm 13 is the mirror image of the connection of the hook 17 to the arm 14. Accordingly, for convenience and clarity of illustration, the connection of the hook 17 to the arm 14 will be described in detail by reference to Figures 3 and 4.

The fish hook 17 has a shank 20 and an end eyelet 21. The shank 20 is disposed in essentially a horizontal path to provide one of the outstanding advantages of the invention. It will be seen that if the hook 17 is suspended with the shank 20 in a generally vertical position, which is the common situation in prior art devices, a fish will have some difficulty in taking bait suspended by the hook. This is true because the shank interferes with a fish attempting to take the bait. The fish can only approach from one side of the hook and then can only take a limited grip on the bait because he will contact the shank 20. However, when the hook is suspended with the shank in a horizontal position, the fish can readily swallow both the bait and the hook. Further, with the hook so disposed, a fisherman can almost invariably hook a fish if he jerks his line whenever a firm bite is felt. This is definitely not the case when the hook is suspended with the shank in a vertical position.

It has long been known that it is important to use a fish hook which is of an appropriate size for the fish which are biting or being sought by a fisherman. With the shank of the hook suspended in a horizontal position, selection of an appropriately sized hook becomes increasingly important, because one wishes to have the fish take the entire loop of the hook in his mouth. Accordingly, one of the outstanding advantages of the invention is the provision of novel means for facile interchange of hooks to provide a hook sized appropriately for a given condition. This connection takes the form of means to resiliently grip and hold one of a group of hooks in varying sizes in a readily disconnectable connection.

In its preferred and disclosed form this disconnectable means is shown most clearly in Figures 3 and 4. The first and second hook holding loops 22, 23 are formed with a horizontal connecting part 24 disposed between them. The hook holding loops 22, 23 and the connecting part 24 all are parts of the extension arm 14, which parts are formed near the remote or outer end of the arm 14. Preferably the loops are not bent in a spiral fashion, but rather in what might be referred to as "opposite directions" so that the connecting part 24 lies offset from, and generally parallel to, the body of the arm 14. This provides a shank access entrance 25 which will subsequently be described in more detail.

The arm 14 also has a shank gripping section 26 which, as viewed from the top, extends from the loop 23 over the shank 20. Preferably, remote or bitter end 27 of the arm 14 is bent to peripherally receive the shank 20. In this preferred form the remote end 27 peripherally embraces the lower side of the shank 20.

In forming a connection between the arm 14 and the hook 17 the eylet 21 is first threaded over the remote end 27. The eylet 21 is then threaded over the gripping part 26, around the loop 23, along the connecting part 24, and then onto the loop 22. The shank 20 is then passed through the shank receiving opening 25 to dispose the shank through the loop 23. This places the shank in a position where its axis is essentially transverse to the axis of the loop 23. The gripping portion 26 is then distended around the shank 20, and the shank 20 is disposed in the remote end 27.

The hook 17 is held against movement in a horizontal plane by coaction of various parts of the hook connection. The threading of the eylet 21 onto the loop 22 anchors that end of the hook. The gripping portion 26 resiliently urges the barbed end of the hook sidewise (upwardly as seen in Figure 4) to press the shank 20 against the side of the loop 23 at 30. Thus, the side of the loop at 30 serves as a fulcrum against which the shank 20 is pressed to position the hook 17 in the horizontal path.

The hook 17 is held in a vertical plane in a fashion similar to that which limits movement of the hook relative to the spreader in a horizontal path. The bitter end 27 urges the shank upwardly against the connecting part 26 where it crosses over the shank at 31. Thus, the connecting part 26 serves as a fulcrum about which the shank is urged by pressure of the bitter end 27. This urging moves the eyelet 21 downwardly against the loop 22 to hold the hook against vertcal movement relative to the arm 14.

Twisting movement of the shank of the hook 20 is essentially prevented by coaction of the eylet 21 and the loop 22. It will be seen that some amount of twisting will be present especially if a relatively large hook is used. However, the coaction of the eylet 21 and the loop 22 sufficiently controls this twisting so that there is no adverse effect on the performance of the device. In fact, it is believed that the minimal amount of twisting present permits the bait to twist back and forth slightly under urging of relative movement of the bait and water. This minimal amount of movement is believed to attract fish and thereby improve the performance of the device.

In Figure 2 a modification is shown which is designed for use in areas where game laws prohibit the use of more than one hook. In the device of Figure 2 the extension arm 14' is held in a horizontal position like the arm 14. The hook connection is identical to that of the arm 14. The modification is in the form of the connection to the line 15. In this embodiment a loop 35 is formed in the end of the arm 14'. The line 15 is tied to the loop 35. An arm support prop 36 is connected to the arm 14' at 37. The support prop 36 has a line connecting loop 38 formed at the end opposite the connection 37. The loop 38 is also tied to the line 15. The coaction of the connections formed at the loops 35, 38 plus a weight 39, which keeps the line 15 tensioned and vertical, holds the arm 14' in essentially a horizontal position.

While the invention has been described with a particular amount of detail it is believed that it essentially comprises a novel fish hook holder which is an elongated thin member adapted to be held in a horizontal position and which member has line connection means arranged to provide such horizontal holding, and hook connection means for selective, repeated and resilient connection of any one of a plurality of fish hooks.

Although the invention has been described in its preferred form with certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:
1. A fishing device comprising an elongated one piece wire spreader having first and second ends, the spreader having a line connection loop formed midway between the ends, the spreader having a twisted portion connecting said loop to the remainder of the spreader, the spreader having first and second horizontal extension arms extending transversely from said twisted portion, said first and second arms including said first and second ends respectively, said spreader having first and second fish hook connection means formed at the first and second ends respectively, and first and second fish hooks connected to said spreader by said first and second connection means, each of said hooks having a shank terminating at a hooked end and an eye end, said fish hooks being connected to said spreader by said connection means for facile connection and disconnection, said hooks and spreader being relatively positioned by the inherent resilient gripping of said connection means, said connection means each comprising; first and second loops formed by bending each of the extension arms adjacent the respective ends, said first and second loops of each extension arm being spiralled in opposite directions, and a shank gripping end portion projecting from the second loop to the end of the arm; each of said hooks having an eyelet at the eye end, the eyelet encircling a portion of the wire defining one of the first loops, each of said hook shanks being disposed through the contiguous and second loop, and said gripping end portions each resiliently gripping the respective hook shanks at a location between the hoops and the hooked end, and the bitter end of each of said extension arms being bent to at least partially peripherally embrace a hook shank, said extension arms each being under tension to retain the hooks in contact with the arms and the loops.

2. In the combination of a wire leader and a fish hook removably connected to one end of the leader, wherein the fish hook has a shank terminating at an eyelet end and a hooked end, the improvement which comprises, a leader having a line connection end and means to connect a line in a position substantially normal to the axis of the leader, the leader also having a hook connecting end, said leader having first and second loops formed adjacent said hook connection end, said first and second loops being spiralled in opposite directions, said leader also having a shank gripping portion projecting from the second loop to the hook connection end, said hook eyelet encircling a portion of the leader defining the first loop, said shank being disposed through the second loop, said gripping end portion being in resilient gripping engagement with the shank at a location between the loops and the hooked end, and the bitter end of each of said extension arms being bent to at least partially peripherally embrace the shank, said extension arm being under tension to retain the hook in engagement with the arm and the loops.

References Cited in the file of this patent

UNITED STATES PATENTS

| 807,135 | Smith | Dec. 12, 1905 |
| 2,331,215 | Minceberg | Oct. 5, 1943 |
| 2,479,484 | Fornas | Aug. 16, 1949 |
| 2,615,275 | De Mello | Oct. 28, 1952 |
| 2,746,199 | Dyczkowski | May 22, 1956 |
| 2,871,612 | Mohn | Feb. 3, 1959 |